United States Patent [19]

Garcia

[11] 4,233,126
[45] Nov. 11, 1980

[54] OZONE PRODUCED BY CHEMONUCLEAR GENERATION

[75] Inventor: Robert I. Garcia, Baton Rouge, La.

[73] Assignee: Innovative Chemicals, Inc., Baton Rouge, La.

[21] Appl. No.: 913,699

[22] Filed: Jun. 8, 1978

[51] Int. Cl.² .............................................. B01J 1/10
[52] U.S. Cl. .......................... 204/157.1 H; 204/176; 210/760; 250/527; 250/432 R; 250/435; 423/581
[58] Field of Search .......... 250/527, 532, 533, 432 R, 250/435, 436; 204/157.1 H, 176; 210/63 Z; 423/581

[56] References Cited

U.S. PATENT DOCUMENTS

| | | | |
|---|---|---|---|
| 3,067,115 | 12/1962 | Clingman, Jr. | 204/157.1 H |
| 3,554,887 | 1/1971 | Feehs | 250/527 |
| 3,948,774 | 4/1976 | Lindman | 250/532 |
| 3,993,911 | 11/1976 | Graentzel | 250/527 |
| 4,124,467 | 11/1978 | Pincon | 250/527 |

FOREIGN PATENT DOCUMENTS 2500947  7/1976  Fed. Rep. of Germany ........ 210/63 Z Primary Examiner—Deborah L. Kyle
Attorney, Agent, or Firm—Roy, Kiesel, Patterson & McKay

[57] ABSTRACT

Processes and apparatus are disclosed for generation of radioisotope contaminant fission fragment free ozone from oxygen containing streams by chemonuclear irradiation accomplished by passing the stream past high energy radiation sources placed in sealed chambers.

18 Claims, 4 Drawing Figures

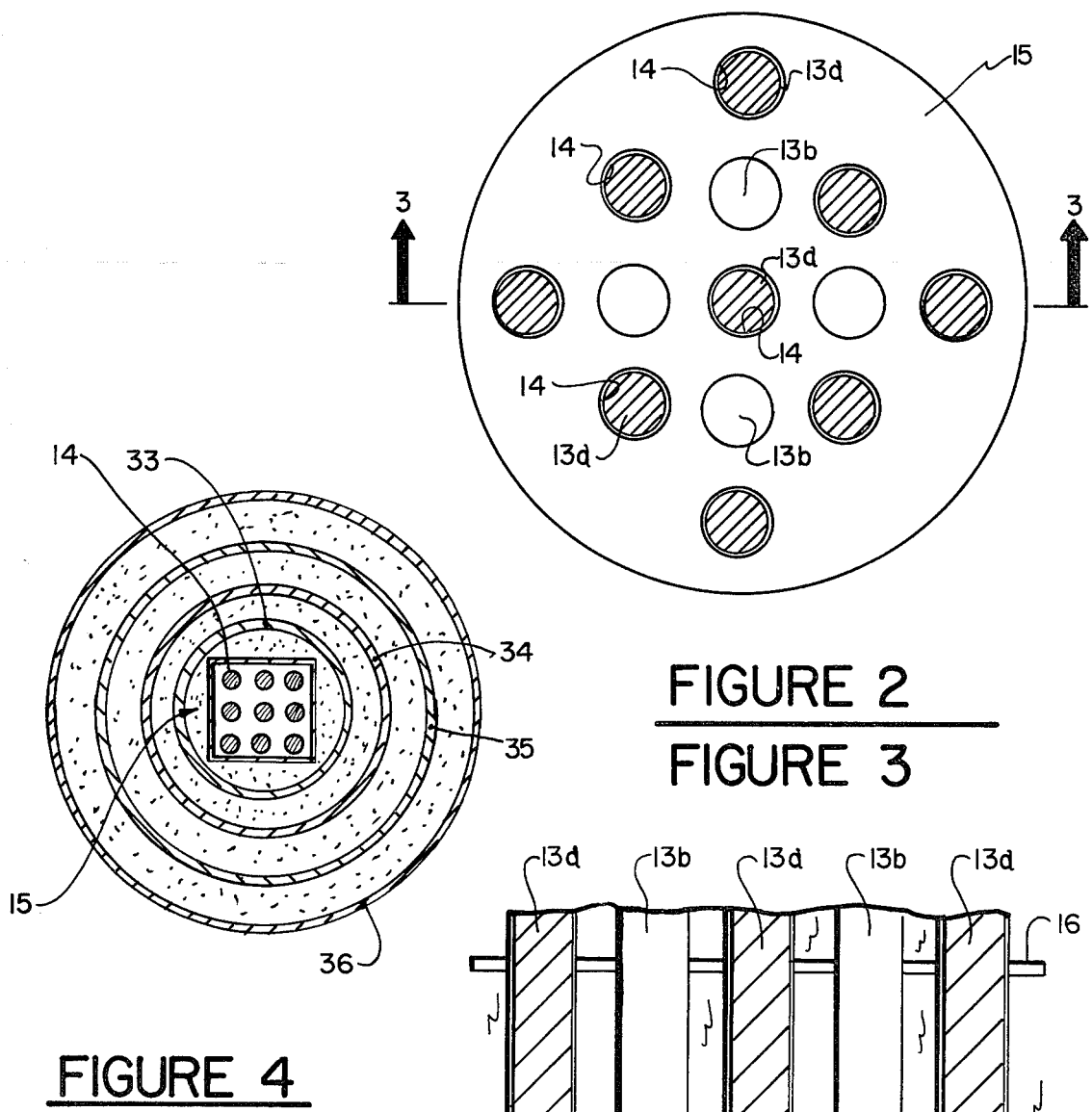
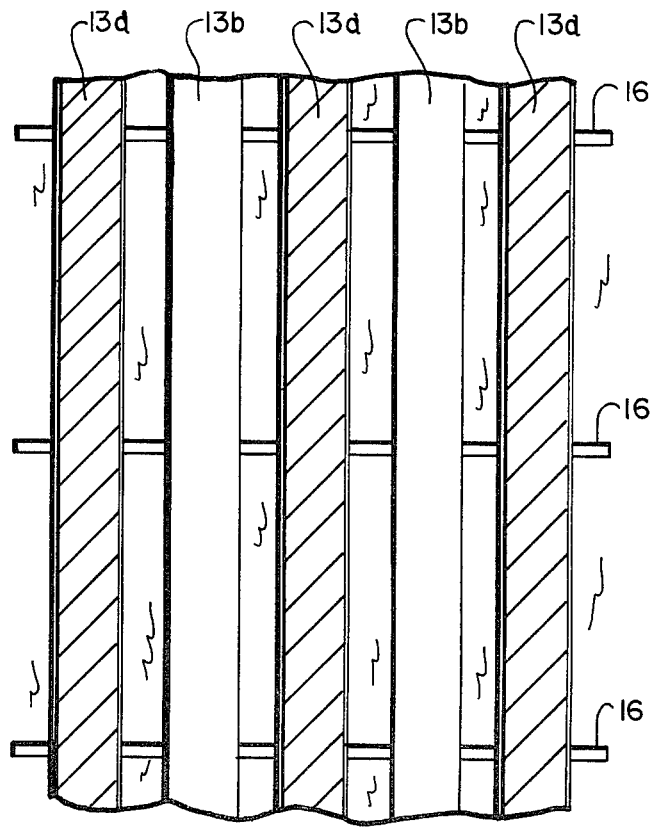
FIGURE 2 / FIGURE 3
FIGURE 4

OZONE PRODUCED BY CHEMONUCLEAR GENERATION

BACKGROUND OF THE INVENTION

1. Field of the Invention

The present invention relates to processes and apparatus for producing ozone from oxygen containing streams by chemonuclear irradiation.

2. Prior Art

The use of ozone as an oxidizing agent has long been known, but present day commercial techniques for the production of ozone are too expensive for most uses. However, the need to reduce environmental and health hazards has increased the demand for use of ozone. For example, potable water supplies for municipalities and/or industrial use which are drawn from surface water sources are traditionally treated with chlorine in order to destroy objectionable microbiological agents contained in the water. Additionally, the chlorination is often effective in reducing the odor and taste causing materials contained in surface originating water supply sources. Until recent years there has been no known adverse effect from this original chlorination treatment used almost universally all over the world for surface source potable water treatment. However, recent scientific investigations have shown that even with the very light chlorination that is utilized in treating surface waters for potable water use, such treatment causes a minute amount of chlorine contained in the water to react with man-made chemical effluents which have found their way into main stream water sources and also to react with naturally occurring, soluble, organic materials normally occurring in surface water derived from lakes and rivers, e.g., tannin type material from the decomposition of leaves, etc. Recent testing has shown that certain of these materials are believed to be carcinogens and the governmental agencies are taking steps to require municipalities and other entities to treat their chlorinated drinking water to remove carcinogens, particularly, chloroform as the trihalomethanes. At the present time, the process being advocated for removal of these objectionable chlorinated carcinogens is to pass the chlorinated drinking water through large beds of activated charcoal. Such installations are anticipated to have a severe economic impact upon the municipalities where government regulations require this treatment due to the extreme economic burden of installing very large carbon treatment facilities and the additional burden and expense of regenerating and replacing the many tons of activated charcoal required to effectively remove these parts per million and parts per billion carcinogenic chlorinated materials. Thus, it can be seen that this can be expected to cause a substantial increase in the cost of municipal and industrial drinking water. Laboratory and pilot plant tests reported so far show that the chlorinated organic materials expend the activated carbon beds at a very rapid rate. Thus, it is anticipated that extremely high cost will be involved in periodic replacement of the spent beds when regeneration is no longer feasible.

It has recently been proposed to utilize ozone as a pretreatment step for the chlorinated surface water prior to its being fed to the charcoal filter beds. Evidence in one study indicates that the bed lives can be lengthened considerably by such techniques.

Numerous devices and processes have been proposed over the last few years for the treatment of liquid waste streams such as sewage and industrial effluents with direct irradiation, preferably gamma radiation generated from gamma producing sources in order to effect secondary or tertiary treatment of such effluent stream to reduce the biological active content of these streams and also reduce the chemical oxygen demand and the total organic carbon content of these waste streams. However, as far as is known, the proposed apparatus and processes devised so far have not found any appreciable commercial application in the treatment of effluent streams to date.

Work was conducted for a number of years at Brookhaven National Laboratory which was reported in Chemical Engineering Progress Symposium, No. 104, Vol. 66, pages 205-219, published in 1970 in an article entitled "Ozone Synthesis for Water Treatment by High Energy Radiation". This article describes the generation of ozone in a pilot reactor in the Brookhaven U-235 fuel pilot reactor. The economics detailed in this paper indicate a substantially cheaper production cost for ozone generated in this manner than that generated by the conventional electric discharge process. Additionally, the study indicates that sewage and/or drinking water can be treated with ozone generated in this manner after the ozone has been chemically purified to remove the radioactive fission fragments which contaminate the stream as derived from the U-235 loop reactor.

While the above Brookhaven study points a way for a more economical manner of generating ozone and treating sewage and drinking water, the problem remains that radioisotope contaminant fragments must be removed from the ozone stream before it would be practical and feasible to utilize the ozone produced by this process in an economical and safe system for municipal and industrial liquid stream treatments.

Therefore, there is a need for a more simplified and straightforward chemonuclear generator and liquid treatment process which utilizes the ozone produced therefrom, which generator and process will not be subjected to the high cost of the liquification and chemical removal of the isotopic fragments which would not be safe to allow contact with the water to be treated.

SUMMARY OF THE INVENTION

It is an object of the present invention to provide an apparatus for generating ozone cheaply using radioactive material.

Additionally, it is an object of the present invention to provide an apparatus for the generation of ozone cheaply using radioactive material and apparatus for the treatment of waste streams or potable water streams.

It is another object of the present invention to provide an apparatus which can produce ozone by utilizing a cheap source of radioactive material such as spent fuel rods from nuclear powered generating plants or gamma ray emitting sources from nuclear material reprocessing plants.

A further object of the present invention is to provide an apparatus and method for treating liquid streams with ozone generated by radioactive sources, which apparatus and process are economical and employ a minimum number of relatively inexpensive components.

The foregoing and other objects of the invention are carried out in a process by providing a chemonuclear ozone generator having a plurality of generally parallel, spaced apart generator tubes received in a coolant container. A nuclear generating high energy radiation material is placed in sealed tubes in some of the generator tubes. An oxygen containing material is flowed through the remainder of the generator tubes to generate ozone in the oxygen fluid material. Cooling liquid is circulated through the coolant container to remove the heat therefrom.

In the apparatus aspects of the present invention, an apparatus is provided for generating ozone containing streams by nuclear radiation. The apparatus includes a coolant container means for a chemonuclear ozone generator. The chemonuclear ozone generator is received in the coolant container. The generator includes a plurality of spaced apart generator tubes. Radioactive nuclear material for producing radiation is received in some of the tubes. Means are provided for feeding an oxygen containing stream to one end of the remainder of the generator tubes and the means for collecting the ozone containing stream from the other end of the generator is also provided.

Other objects and advantages of the present invention will be apparent from the following description of embodiments of the present invention.

BRIEF DESCRIPTION OF THE DRAWINGS

FIG. 2 is a cross-sectional view taken along line 2—2 of FIG. 1.

FIG. 3 is a vertical, elevational view taken along line 3—3 of FIG. 2.

FIG. 4 is a cross-sectional view of another embodiment of the ozone generator of this invention.

PREFERRED EMBODIMENTS OF THE INVENTION

Figure 1:
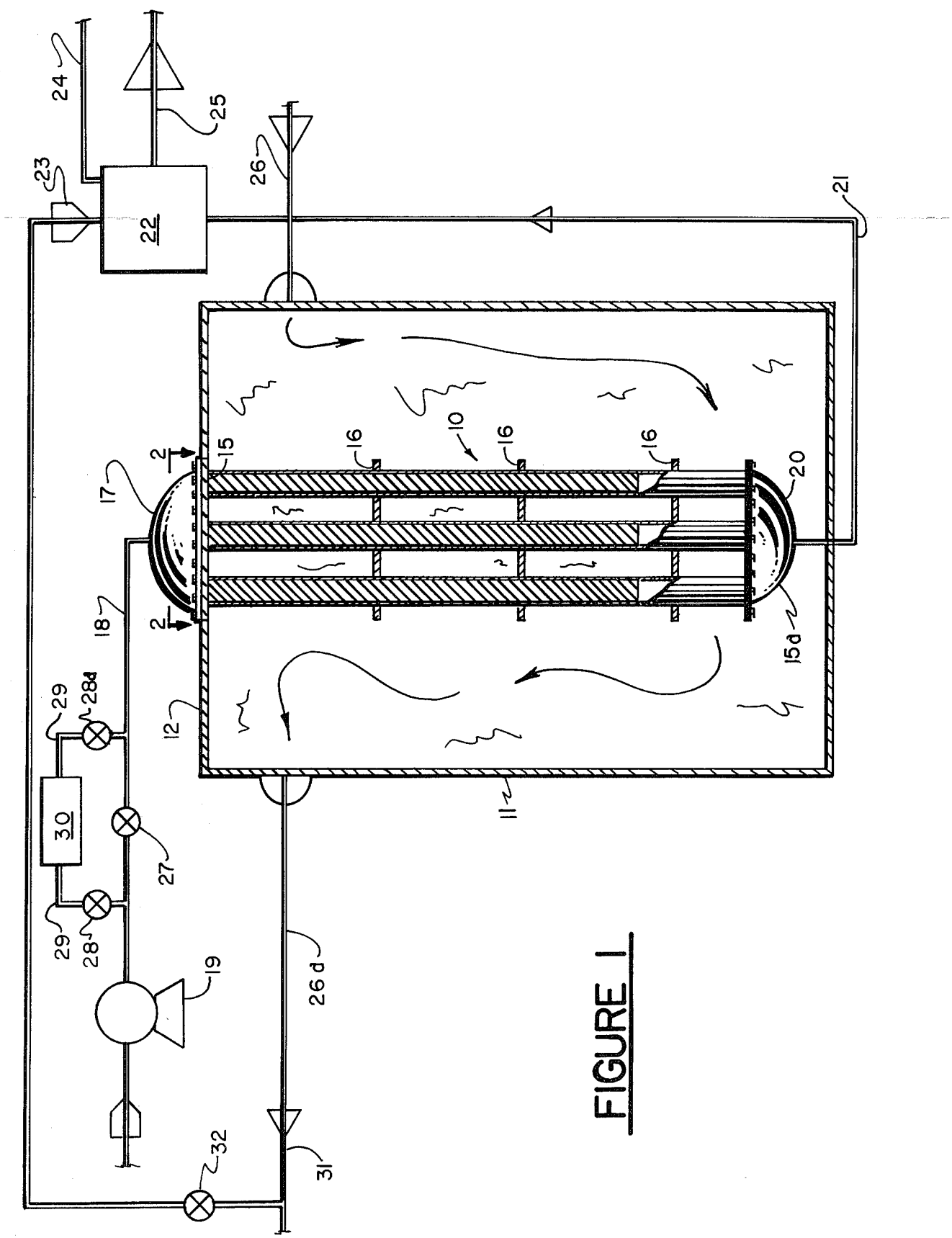
FIG. 1 is an elevational, schematic view of the apparatus of the present invention for generating ozone by irradiating an oxygen containing stream.

Referring now to FIG. 1, the chemonuclear ozone generator, designated by the numeral 10, is supported by appropriate support means (not shown) inside a coolant shield vessel 11 which is covered by a removable shield top 12. As seen more clearly in FIGS. 1, 2 and 3, the ozone generator includes a plurality of spaced apart tubes 13a and 13b which are arranged in a generally circular pattern when viewed from the top as seen in FIG. 2. Tubes 13a receive a slip fit removable tube 14 which contains a charge of a suitable high energy (5 eV or greater) generating material, preferably such as cesium 137 or cobalt 60 or other suitable preferable sources such as spent fuel residue or other gamma or beta emitting material. The other tubes 13b are open at each end of their ends and are to provide the passageway for the oxygen containing material, preferably fluid or gaseous, in which the ozone will be generated by the high energy radiation produced from the fuel contained in the fuel tubes 14. Each end of the tubes 13a and 13b are attached by suitable means (swagging or welding or other suitable coupling) to a top tube sheet 15 into a bottom tube sheet 16. A plurality of spaced apart support plates 16 are provided with suitable frictional fit openings which receive the tubes and are distributed along the lengths of the tubes in order to provide support for the tubes and strengthen the overall generator assembly. The nuclear material tubes 14 will be thoroughly and carefully sealed so that there will be no chance of leakage or escape of the fuel material, whether it be in the pellet or powder form.

The top manifold 17 is attached to the top tube sheet 15 by any suitable means to provide a vapor and liquid seal, e.g., bolts and gaskets through suitable flanges. Oxygen containing material inlet conduit 18 is attached to the top of the top manifold by any suitable means. Pump 19 is used to raise the pressure of the oxygen containing material fed to the ozone generator since it has been found that the efficiency of ozone generation is considerably improved if the oxygen containing feed stream is pressurized as it is exposed to the high energy radiation.

A bottom manifold 20 is attached to the bottom tube sheet 15a in the same manner as described for attachment of the top manifold cover. An oxygen-ozone outlet conduit 21 is connected to the bottom of the bottom manifold and extends to the contactor 22. Contactor 22 may be any suitable type of contactor used for scrubbing or treating liquids with gas or liquid to liquid contactors, depending upon the physical state of the oxygen-ozone mixture being fed to the contactor. Suitable contactors may be conventional saddle or pebble filled contactors, bubble plate columns, screen pack columns, sieve tray columns, submersible turbines or any other suitable gas-liquid or liquid-liquid contact vessels which are well known to those skilled in the chemical engineering art. An inlet conduit 23 brings in the liquid material to be treated, e.g., potable untreated water, primary or secondary treated sewage or other suitable clarified or nonclarified effluent streams which are desired to be oxidized. Oxygen-ozone vent line 24 is attached to the top of the contactor and takes off the unabsorbed oxygen and what small residual ozone may remain mixed therein. This stream can be sent to a preliminary liquid contactor which treats the liquid stream to remove nitrogen oxides therefrom prior to the main contactor 22, if so desired. If the ozone content is sufficiently high, it can be selectively absorbed in a suitable solvent or subsequently stripped from a gas stream therefrom for recycle to the contactor 22. Ozonated liquid material is removed from the contactor through conduit 25. The contactor becomes a separator when liquid ozone is generated.

Inlet coolant line 26 is provided to introduce a liquid coolant to the coolant vessel 11 and exit coolant line 26d is provided on the opposite side of the coolant vessel for removal of the coolant therefrom. Suitable source of coolant material will be supplied from suitable tanks or ponds or, if desired, part of the feed stream coming into contactor 22, i.e., a portion of the liquid to be ozonated can be used as coolant fluid and thus obtain the benefit of exposure to radiation as it flows between the tubes containing the radioactive source material. This is a preferred method of operating the process of the present invention so that maximum benefit is obtained from the radiation source, i.e., a direct treatment of the liquid material by gamma radiation to reduce BOD and total oxygen content and bacterial content. It will be understood that those skilled in nuclear reactor art will readily be able to determine the appropriate size for the cooling tank, the appropriate flow rate for the fluid therethrough and the appropriate size of the tubes and the lengths thereof used to fabricate the chemonuclear ozone generator.

Materials for construction used in the generator tubes are important in that they should be made from a metal which is a poor absorber of gamma radiation (if gamma radiation is the high energy radiation used) and which has a capability of releasing photons from gamma irradiation. These photons are used for the conversion of the oxygen to ozone. Among the many metals which are suitable for forming the tubes are titanium, vanadium, tantalum, chromium, molybdenum and aluminum or alloys of the aforementioned materials. The preferred materials are titanium and aluminum, since these metals have a natural affinity for forming thin coatings of their oxides on their surfaces when exposed to air and/or oxygen containing streams. Aluminum and titanium oxides are known materials which will exhibit "flourescence", i.e., they will absorb radiation from a high energy radiation source and become electronically excited and, subsequently, release this absorbed energy in the form of emission of one or more photons of lower energy than that absorbed. These photons, if of sufficient energy, are capable of conversion of oxygen to ozone. By utilizing these selected fluorescent materials, the efficiency of ozone production from oxygen is increased over that when no flourescence is present. When initiated by gamma radiation, these emitted photons will carry energy greater than about five electron volts (5 eV) and thus produce ozone from oxygen. Reflected or scattered gamma radiation is capable of producing this same cascading effect in the chemonuclear ozone generator.

It is for the foregoing reason that the chemonuclear generator is preferably constructed with at least a portion of the fuel containing tubes 14 filled with the gamma radiation producing material to a length that is somewhat less than the entire length of the tubes to provide an empty section either at the top or the bottom of the tubes where gamma radiation can generate additional electromagnetic energy (photon energy) which, in turn, can activate the oxygen containing material passing through the gas conveying tubes 13b.

It is important that the gas containing tubes 13b have their interior surfaces coated with a "flourescing" oxide, e.g., aluminum oxide or titanium oxide, in order that the above described fluorescence photon generation phenomenon can be utilized to provide improved efficiencies in the generation of ozone from the oxygen containing material passing through the tubes 13b.

The oxygen containing material utilized to generate the ozone in the present apparatus may be fed to the chemonuclear generator in a wide variety of forms. One of the more preferred forms is to feed the oxygen containing material tubes with predried air. As seen in FIG. 1, the pump 19 may take air directly from the atmosphere and when valve 27 in conduit 18 is closed and valves 28 and 28a in dryer conduit 29 are open, the atmospheric air will flow through a dryer 30, which dryer can be filled with any suitable drying agent such as silica gel, alumina for removing moisture from the air or may be chilled. Previous work has indicated that the efficiencies of ozone generation are substantially increased with the moisture content of gaseous air reduced to low limits. In addition to using air, preferably dried, oxygen can be supplied to the chemonuclear generator in the form of relatively pure oxygen gas which pump 19 can obtain from an air separation plant of conventional design. However, it is not preferred to feed relatively pure gaseous or liquid oxygen to the chemonuclear generator since the Brookhaven work (supra) has indicated that the addition of a certain amount of nitrogen to the oxygen carrying stream enhances the efficiency of ozone generation. In one preferred form, the gaseous oxygen being fed by the pump 19 to the generator can be premixed with gaseous nitrogen from an air separation plant or other source. Additionally, gaseous or liquid oxygen or gaseous or liquid air can be diluted with other inert gases which do not produce adverse or harmful materials in addition to the desired ozone, an example of such a diluent material is argon. In addition to feeding the chemonuclear generator with a gaseous oxygen containing material, the chemonuclear generator can be fed with dried air which has also been enriched with gaseous oxygen in order to raise the potential level of ozone formation therein. Also, the chemonuclear generator can be fed with relatively pure gaseous oxygen which can be obtained preferably from an air separation plant or from other suitable sources. Other sources of feed for the oxygen streams to be fed to the ozone generator can be liquid air under suitable conditions of temperature and pressure to maintain it in the liquid state through the generator. Subsequently, the liquid air-ozone stream can be depressurized and heated to suitable temperature and fed to the contactor 22 as a gas. Other sources of oxygen feed for the generator may be any relatively inert liquid, such as nitrogen or argon containing liquid oxygen in suitable amounts for efficient formation of ozone therein. In another preferred embodiment, materials having fluorescent characters when bombarded with high energy radiation, such as aluminum oxide, can be added to the oxygen streams. Again such a liquid stream can be gasefied and heated prior to injection into the contactor for treating the liquid stream. In addition, the liquid ozone may be stripped from a liquid stream.

The liquid used for cooling the chemonuclear generator can be derived from any number of sources. The cooling material is preferably water for reasons of economy and the fact that it is a poor absorber for gamma radiation while effecting cooling and shielding, thereby allowing gamma rays to strike the ozone-oxygen stream tubes. The water may be conventional cooling tower water fed through the inlet coolant line 26 and returned to the cooling tower through exit cooling line 26a. If desired, the reactor may be cooled by the liquid material to be treated, i.e., potable water stream for municipality or an industry, or a sewage or effluent stream for a municipality or industry. Such an arrangement is shown in FIG. 1 wherein the material to be fed to the contactor 22, or at least a portion thereof is fed into the coolant and shielding tank 11 by means of inlet conduit 26 and exits through line 26a and then passes through contactor alternate feed line 31 when valve 32 is in the open position. This arrangement for utilizing the material to be treated in the contactor with ozone as the coolant material for the ozone generator provides an advantage that the liquid is further treated in the vessel 11 by virtue of the fact that it flows into intimate contact with the tubes 13a containing the nuclear generating material and is thus exposed to a substantial amount of gamma radiation. And as is well known, gamma radiation is very effective in destroying microbiological organisms, reducing the chemical oxygen demand of fluid streams, reducing the total oxygen demand of fluid streams and removing odors and colors therefrom.

The nuclear fuel contained in the fuel tubes or rods 14 is selected from any suitable radioactive generating source for high energy radiation, preferably gamma or beta radiation. Preferred available materials, for the radioactive nuclear component in the generator tube, are cobalt 60, cesium 137, spent fuel rods and gamma or beta emitting residue from nuclear fuel reprocessing.

The reason these materials are preferred is that they are gamma or beta emitters and that they are present in large quantities in fuel rods from uranium 235, plutomium 239 and uranium 233 powered nuclear power plants. By utilizing nuclear fuel rods which have decayed to the level wherein they have been required to be removed from a nuclear power plant generator, the apparatus of the present invention is able to utilize an extremely cheap source of radioactive material for generating the gamma radiation to convert the oxygen containing stream into an ozone containing stream. As pointed out supra, the problem of disposing of spent fuel rods from nuclear electrical generating plants which use uranium 235 is an extremely serious problem facing the United States and other countries of the world utilizing nuclear generators for generating electricity. These fuel rods must be stored in very careful conditions to prevent contamination and harm to any human or animal life. The present invention provides an excellent means for obtaining additional use from these rods which are spent as far as being useful in generating electricity since they are still useful as a source of gamma radiation from the fission created products provided by the isotopic fragmentation of the radioactive fuel mentioned supra into the desired radioactive materials for safe treatment of fluid streams when used as a cooling water and as a provider of sufficient gamma radiation to produce efficient quantities of ozone in the oxygen containing streams passed through the gas tubes in the ozone generator.

FIG. 4 illustrates another configuration of the generator wherein the fuel rods or tubes 14 are packaged in a conventional fuel bundle arrangement 15 which is placed in a center metal tube 33 surrounded by concentric metal tubes 34, 35 and 36. Coolant flows between bundle 15 and tubing 33 and oxygen containing stream flows between tubing 33 and 34 and between the other tubings 35 and 36 as shown. There can be as many concentric tubes as desired.

In operation, either an oxygen containing gaseous or liquid stream is fed thorugh conduit 18 and pressurized therein by the intake pump 19 into the upper manifold 17 of the chemonuclear ozone generator 10. The manifold distributes the gas into the open tubes 13b which are interspersed between the nuclear containing tubes 13a. As the oxygen containing fluid passes through these tubes, the gamma radiation produced by the radioactive material in the tubes 13a penetrates the walls of the tubes 13a, passes through the water and treats it as hereinbefore described and passes through the walls of the oxygen containing tubes 13b and strikes the oxygen molecules therein and converts them to ozone. As described in some detail hereinbefore, the formation of ozone continues in the lower end of the gas or liquid oxygen passage tubes 13b even though they extend below the level of the radioactive material contained in the carrier tubes 14 by virtue of the "fluorescence" effect. The oxygen-ozone containing fluid passes out the lower ends of the tubes 13b and is collected in the lower manifold 20 and carried by the ozone-oxygen outlet conduit 21 to the contactor 22 where it is mixed in intimate contact with the material to be treated, e.g., potable water or sewage or other effluent stream. Excess oxygen and residual ozone is vented through line 24 and may be recycled or stripped or purified as mentioned before. Treated liquid stream is removed from the contactor 22 by exit conduit 25 and may then be sent to suitable further storage or disposal sources.

It will be apparent that modifications other than those described hereinbefore, such as utilizing scintillation techniques when using a beta emitting material or obtaining photoactivation from Cd, In or Co in alloys used in the generator tubes, can be made to the process and apparatus of the present invention without departing from the spirit and scope of this invention, and it is understood that the invention is to include all such modifications which might be made thereto.

What I claim is:

1. The process for producing ozone from an oxygen containing stream comprising:
    (a) providing a chemonuclear ozone generator having a plurality of generally parallel, spaced apart generator tubes received in a coolant container;
    (b) placing sealed tubes containing gamma-ray emitting material within some of said generator tubes, and at least the interior surface of said remaining tubes being a material that emits photons which have an energy greater than about 5 eV when contacted by the gamma radiation;
    (c) flowing said oxygen containing stream through said remaining generator tubes and thereby subjecting the oxygen containing stream material to irradiation from said surface material in combination with direct gamma irradiation to generate ozone in said oxygen material; and
    (d) flowing a cooling fluid over said generator tubes to remove heat therefrom.

2. In the process of claim 1 wherein said gamma ray emitting material is selected from the preferred group consisting of cobalt 60, cesium 137, spent fuel elements, or gamma emitting reprocessing residue.

3. In the process of claim 1 wherein said oxygen containing stream is selected from the group consisting of gaseous air, gaseous oxygen, gaseous oxygen diluted with an inert material, gaseous air containing additional gaseous oxygen, liquid air, liquid oxygen diluted with an inert material, liquid air containing additional liquid oxygen, liquid oxygen, liquid nitrogen containing liquid oxygen, gaseous air mixed with a fluorescing material, gaseous oxygen mixed with a fluorescing material, liquid air mixed with a fluorescing material and liquid oxygen mixed with a fluorescing material.

4. In the process of claim 1 wherein a liquid stream to be treated by said ozone is contacted by said ozone containing stream.

5. The process of claim 4 wherein said liquid to be treated is a potable water stream.

6. In the process of claim 4 including the additional step of treating said ozone containing stream to remove nitrogen oxides therefrom prior to contacting said liquid stream to be treated with said ozone containing stream.

7. In the process of claim 4 wherein said cooling liquid and said liquid stream to be treated with said ozone containing stream are derived from the same source.

8. In the process of claim 4 wherein said liquid stream after treatment with ozone is further subjected to treatment by passing through a bed of activated charcoal.

9. In the process of claim 1 wherein said sealed tubes containing the gamma-ray emitting material are of a length less than the length of the generator tubes which receive said sealed tubes.

10. In the process of claim 1 wherein said generator tubes are constructed of a metal selected from the group consisting of aluminum and titanium.

11. An apparatus for generating ozone from an oxygen containing stream by nuclear radiation, said apparatus comprising:
 (a) coolant container means for a chemonuclear ozone generator;
 (b) a chemonuclear ozone generator received in said coolant container, said generator including a plurality of spaced apart generator tubes;
 (c) sealed tubes containing gamma-ray emitting material received in some of said generator tubes;
 (d) the remaining generator tubes being provided with an interior surface of a material that emits photons which have an energy greater than about 5 eV when contacted by said gamma radiation;
 (e) means for feeding an oxygen containing stream to one end of said remaining generator tubes for subjecting said oxygen containing stream to irradiation from said surface material in combination with direct gamma radiation and generating ozone in said oxygen containing stream; and
 (f) means for collecting the ozone containing stream from the other end of said remaining generator tubes.

12. In the apparatus of claim 11 wherein said generator tubes are arranged in a generally cylindrical configuration and said means feeding and collecting said oxygen and ozone containing streams includes a tube sheet at each end of said generator tubes and a manifold sealingly connected to the periphery of said respective tube sheets.

13. In the apparatus of claim 11 wherein a plurality of generator tube support plates are provided in spaced apart locations over the length of the generator tubes.

14. In the apparatus of claim 11 including means for circulating coolant through said coolant container.

15. In the apparatus of claim 11 wherein the generator tubes containing gamma ray emitting material are filled with said material only over a portion of their full length.

16. In the apparatus of claim 11 wherein the generator tubes are fabricated from a material selected from aluminum and titanium.

17. In the apparatus of claim 11 wherein said tubes carrying said oxygen containing stream are surrounded by spaced apart tubes carrying said radioactive nuclear material.

18. An apparatus for generating ozone by nuclear radiation and treating a liquid stream with the ozone so produced, said apparatus comprising:
 (a) coolant container means for a chemonuclear ozone generator;
 (b) a chemonuclear ozone generator received in said coolant container, said generator including a plurality of spaced apart generator tubes;
 (c) sealed tubes containing gamma-ray emitting material received in some of said generator tubes;
 (d) the remaining generator tubes being provided with an interior surface of a material that emits photons which have an energy greater than about 5 eV when contacted by said gamma radiation;
 (e) means for feeding an oxygen containing stream to one end of said remaining generator tubes for subjecting said oxygen containing stream to irradiation from said surface material in combination with direct gamma irradiation and generating ozone in said oxygen containing stream;
 (f) means for collecting said oxygen-ozone containing stream from the other end of said remaining generator tubes;
 (g) contactor means for treating said liquid stream with said ozone containing stream; and
 (h) conduct means for conveying said ozone containing stream to said contactor means.

* * * * *